(12) United States Patent
Zuo et al.

(10) Patent No.: US 11,312,375 B2
(45) Date of Patent: Apr. 26, 2022

(54) VEHICLE ANTI-COLLISION FOREWARNING METHOD, SYSTEM AND IN-VEHICLE COMPUTER DEVICE

(71) Applicants: Beijing Idriverplus Technology Co., Ltd., Beijing (CN); Virginia Tech Intellectual Properties, Inc., Blacksburg, VA (US)

(72) Inventors: Lei Zuo, Blacksburg, VA (US); Lisheng Yang, Blacksburg, VA (US); Dezhao Zhang, Beijing (CN); Xiao Wang, Beijing (CN); Xiaofei Li, Beijing (CN); Cheng Xu, Beijing (CN)

(73) Assignees: Beijing Idriverplus Technology Co., Beijing (CN); Virginia Tech Intellectual Properties, Inc., Blacksburg, VA (US)

(*) Notice: Subject to any disclaimer, the term of this patent is extended or adjusted under 35 U.S.C. 154(b) by 182 days.

(21) Appl. No.: 16/564,372

(22) Filed: Sep. 9, 2019

(65) Prior Publication Data
US 2021/0070285 A1 Mar. 11, 2021

(51) Int. Cl.
*B60W 30/095* (2012.01)
*G08G 1/16* (2006.01)

(52) U.S. Cl.
CPC ......... *B60W 30/0953* (2013.01); *G08G 1/166* (2013.01); *B60W 2554/80* (2020.02); *B60W 2556/60* (2020.02); *B60W 2556/65* (2020.02)

(58) Field of Classification Search
CPC ......... B60W 30/0953; B60W 2554/80; B60W 2556/60; B60W 2556/65; G08G 1/166
See application file for complete search history.

(56) References Cited

U.S. PATENT DOCUMENTS

| 2005/0195383 | A1 | 9/2005 | Breed et al. |
| 2015/0035685 | A1 | 2/2015 | Strickland et al. |
| 2016/0381538 | A1* | 12/2016 | Tan ......... H04W 4/08 455/404.2 |

FOREIGN PATENT DOCUMENTS

| CN | 101079179 A | 11/2007 | |
| CN | 102390320 A | 3/2012 | |
| CN | 104933893 A | 9/2015 | |
| CN | 105922934 A | 9/2016 | |
| GB | 2452829 A * | 3/2009 | ............ G08G 1/166 |
| KR | 20140052678 A * | 5/2014 | |

OTHER PUBLICATIONS

English_Translation_GB2452829A (Year: 2009).*
English_Translation_KR20140052678A (Year: 2014).*
First Office Action for Chinese application No. CN 201911135435.6 dated Dec. 10, 2021, 10p, in Chinese language.
English language translation of First Office Action dated Dec. 10, 2021 for Chinese application No. CN 201911135435.6, 12p.

* cited by examiner

*Primary Examiner* — Peter D Nolan
*Assistant Examiner* — Ashley L Redhead, Jr.
(74) *Attorney, Agent, or Firm* — Crowell & Moring LLP (57) ABSTRACT

Disclosed are a vehicle anti-collision forewarning method, an in-vehicle computer device and a vehicle anti-collision forewarning system.

10 Claims, 7 Drawing Sheets

VEHICLE ANTI-COLLISION FOREWARNING METHOD, SYSTEM AND IN-VEHICLE COMPUTER DEVICE

BACKGROUND

The present disclosure relates to Advanced Driving Assistance System (hereinafter, referred to as ADAS), and more particularly to a vehicle anti-collision forewarning method, system and an in-vehicle computer device.

In recent years, ADAS has been used more and more widely in production vehicles, and it has also gained wide recognition for its effects in facilitating driving experience and enhancing driving safety. Owing to advanced sensing and control technology, ADAS may greatly improve the active safety of vehicles and significantly promote the personal safety of road users including drivers, passengers and pedestrians. Currently, a system for pedestrian measurement in the ADAS mainly uses a forward-looking monocular camera as a sensor, identifies pedestrians in the field of vision through image processing algorithms and calculates position of the pedestrian based on pre-calibration of the camera. Because this method is limited by ambient light sources and limited field of view, new measurement methods based on pedestrian handheld devices and vehicle terminal communication have been proposed.

U.S. patent application US 2015/0035685 A1 provides a system and method of vehicle to pedestrian communication. Particularly, it proposes a method for deploying smart communication devices at the pedestrian and vehicle ends to assist in detecting pedestrians in the vehicle's driving environment so as to provide appropriate warnings to pedestrians and drivers. The system consists of smart terminals capable of two-way communication, including but not limited to pedestrian handheld devices such as smart phones and smart bands, and in-vehicle terminal devices such as in-vehicle communication/computing platforms and in-vehicle navigation device.

The method proposed in U.S. patent application US 2015/0035685 A1 can be extended to pedestrian transportation means such as bicycles, wheelchair and so on in addition to pedestrians. The technical solution as defined in U.S. patent application US 2015/0035685 A1 first involves classifying pedestrians using one or more algorithms. The classification method may be an automatic classification using pattern recognition or a manual selection by pedestrians to indicate their current transportation modes. Some intelligent algorithms may also detect a transition of pedestrian categories in certain situations, for example, a pedestrian enters a car to become a passenger or a driver. The classification method may be further extended to detect current state of the pedestrian, including distracted, drunk, and to detect a pedestrian cross-street intention.

Next, based on the pedestrian's classification, the system may calculate current locations of both pedestrian and vehicle through GPS positioning capability of the smart communication device, and predict the future vehicle trajectory and pedestrian trajectory based on the historical trajectory data and the pedestrian state category. Motion state information of the vehicle and the pedestrian is transmitted through Basic Safety Message (BSM) defined in the Dedicated Short Range Communication (DSRC) standard to ensure high frequency transmission under limited bandwidth. Then, a probability of a collision is calculated based on the current locations of the vehicle and of the pedestrian and trajectory predictions of the vehicle and of the pedestrian. Finally, a corresponding alarm is sent by terminals.

However, the inventor recognized that a system and method for alerting a possible pedestrian collision accident have been proposed by deploying computing communication devices at the pedestrian end and vehicle end, but their implementation depends on an important prerequisite, that is, both the pedestrian and the vehicle ends require a positioning device with sufficient accuracy to obtain current location and trajectory data of the pedestrian or the vehicle. However, due to the influence of signal transmission path and Earth's atmosphere, the current satellite navigation may be limited to meter level positioning accuracy. Although an in-vehicle GPS may correct an error by simultaneously receiving the network data of the positioning base station to achieve sub-meter level positioning accuracy, such high-precision terminal at the pedestrian end is difficult to popularize due to costs constraints.

BRIEF SUMMARY

Embodiments of the present disclosure provide a vehicle anti-collision forewarning method, system, and in-vehicle computer device, for solving at least one of the above technical problems.

In an embodiment of the present disclosure, a vehicle anti-collision pre-warning method applied in an in-vehicle computer device is provided, the method comprising: determining a relative position vector and a rate of change of the relative position vector between the vehicle and an external object based on at least satellite pseudorange measurement data of the vehicle and satellite pseudorange measurement data of the external object; determining a first parameter for representing a relative distance between the vehicle and the external object, and a second parameter for representing a relative motion velocity and/or a relative motion direction between the vehicle and the external object based on the relative position vector and the rate of change of the relative position vector; acquiring, from an external terminal carried by the external object, a third parameter for representing a trend of a motion state change of the external object; determining a collision risk index according to a predetermined rule based on the first to the third parameters, wherein the predetermined rule is: the smaller the first parameter, the shorter the relative distance, and the higher the collision risk index; the larger the second parameter, the higher the relative motion velocity or the smaller the angle of the relative motion direction, and the higher the collision risk index; the larger the third parameter, the higher a confidence of the motion state change of the external object, and the higher the collision risk; and identifying whether to send an anti-collision alarm according to the magnitude of the collision risk index.

In another embodiment of the present disclosure, an in-vehicle computer device is provided, comprising: at least one processor; and a memory communicably connected with the at least one processor for storing instructions executable by the at least one processor, wherein execution of the instructions by the at least one processor causes the at least one processor to: determine a relative position vector and a rate of change of the relative position vector between the vehicle and an external object based on at least satellite pseudorange measurement data of the vehicle and satellite pseudorange measurement data of the external object; based on the relative position vector and the rate of change of the relative position vector, determine a first parameter for representing a relative distance between the vehicle and the external object, and a second parameter for representing a relative motion velocity and/or a relative motion direction between the vehicle and the external object; acquire, from an external terminal carried by the external object, a third parameter for representing a trend of a motion state change of the external object; determine a collision risk index according to a predetermined rule based on the first to the third parameters, wherein the predetermined rule is: the smaller the first parameter, the shorter the relative distance, and the higher the collision risk index; the larger the second parameter, the higher the relative motion velocity or the smaller the angle of the relative motion direction, and the higher the collision risk index; the larger the third parameter, the higher a confidence of the motion state change of the external object, and the higher the collision risk; and identify whether to send an anti-collision alarm according to the magnitude of the collision risk index.

In yet another embodiment of the present disclosure, a vehicle anti-collision forewarning system is provided. The system includes an in-vehicle computer device and an external terminal. The external terminal comprises a satellite observation receiver configured for obtaining satellite pseudorange measurement data of an external object, and a transmitter configured for sending motion status information to the in-vehicle computer device. The in-vehicle computer device having at least one processor, a memory in electronic communication with the processor and instructions stored in the memory, wherein execution of the instructions by the at least one processor causes the at least one processor to: determine a relative position vector and a rate of change of the relative position vector between the vehicle and the external object based on at least satellite pseudorange measurement data of the vehicle and satellite pseudorange measurement data of the external object; based on the relative position vector and the rate of change of the relative position vector, determine a first parameter for representing a relative distance between the vehicle and the external object, and a second parameter for representing a relative motion velocity and/or a relative motion direction between the vehicle and the external object; acquire, from the transmitter of the external terminal, a third parameter for representing a trend of a motion state change of the external object; determine a collision risk index according to a predetermined rule based on the first to the third parameters, wherein the predetermined rule is: the smaller the first parameter, the shorter the relative distance, and the higher the collision risk index; the larger the second parameter, the higher the relative motion velocity or the smaller the angle of the relative motion direction, and the higher the collision risk index; the larger the third parameter, the higher a confidence of the motion state change of the external object, and the higher the collision risk; and identify whether to send an anti-collision alarm according to the magnitude of the collision risk index.

In yet another embodiment of the present disclosure, there is also a storage medium storing a program including one or more executable instructions, the executable instructions may be read and executed by an electronic device (including but not limited to a computer, a server, or a network device, etc.) for performing any one of vehicle anti-collision forewarning methods of the present disclosure as described above.

In yet another embodiment of the present disclosure, an electronic device is further provided, which includes at least one processor, and a memory in communication with the at least one processor. In which the memory stores instructions executed by the at least one processor, and when executed by the at least one processor, causing the at least one processor to perform any one of vehicle anti-collision forewarning methods of the present disclosure as described above.

In yet another embodiment of the present disclosure, a computer program product is provided. The computer program product includes a computer program stored on a storage medium. The computer program includes executable program instructions, and when executed by a computer, causing the computer to perform any one of vehicle anti-collision forewarning methods of the present disclosure as described above.

The embodiments of the present disclosure have at least the following beneficial technical effects: a communication based data fusion of the navigation satellite pseudorange values observed by the vehicle and the external object is realized to change an absolute positioning into a relative positioning for an application of vehicle anti-collision, without needing independently calculate the absolute coordinates in each terminal, thereby avoiding potential disturbances encountered in the calculation of coordinates when using a single GNSS receiver, improving the positioning accuracy, and making the anti-collision forewarning more accurate.

BRIEF DESCRIPTION OF THE DRAWINGS

In order to more clearly illustrate the technical solutions in the embodiments of the present disclosure, accompanying drawings to be used in the description of the embodiments will be briefly introduced in the following. Apparently, the drawings in the following description are merely some embodiments of the present disclosure, and other drawings can be obtained by those skilled in the art based on these drawings without any inventive efforts.

DETAILED DESCRIPTION OF THE DRAWINGS AND THE PRESENTLY PREFERRED EMBODIMENTS

In order to make the purpose, technical solutions, and advantages of the embodiments of the invention more clear, technical solutions of the embodiments of the disclosure will be described clearly and completely in conjunction with the figures. Obviously, the described embodiments are merely part of the embodiments of the disclosure, but do not include all possible implementations of the embodiments. Based on the embodiments of the disclosure, other embodiments obtained by the ordinary skill in the art without undue experimentation are within the scope of the disclosure. It should be noted that, embodiments of the present application and the technical features involved therein may be combined with each other so long as they are not in conflict with one other.

The present disclosure may be described in the general context of computer-executable instructions executed by a computer, such as a program module. Generally, a program module may include routines, programs, objects, elements, data structures, and the like that perform particular tasks or implement particular abstract data types. The present disclosure may also be practiced in distributed computing environments where tasks are performed by remote processing devices that are connected through a communication network. In a distributed computing environment, a program module may be located in both local and remote computer storage medium including storage devices.

In the present disclosure, "module", "device", "system" and the like refer to related entities applied to a computer, such as hardware, a combination of hardware and software, software or software in execution, and the like. For example, a component may be, but is not limited to, a process running on a processor, a processor, an object, an executable element, an execution thread, a program and/or a computer. Also, an application or script running on a server, or a server, may be a component. One or more components may be executed in a process and/or a thread, and the components may be localized on a computer and/or distributed between two or more computers, and may be executed by various computer-readable medium. The component may also communicate through local and/or remote processes based on signals having one or more data packets.

Finally, it should be noted that, the expression of "first" and "second" in the embodiments of present disclosure are used to distinguish two different entities or non-identical parameters with the same name. Hence, the expressions of "first" and "second" are only for the convenience of description and should not be construed as the limit to the embodiments of the present disclosure. Moreover, the terms "comprise" and "include" are intended to include not only those elements, but also other elements that are not explicitly listed, or the elements that are inherent to the process, method, item, or device. An element that is defined by the expression "comprising . . . " does not exclude the presence of the same element in the process, method, article, or device, without more restrictions.

Figure 1:
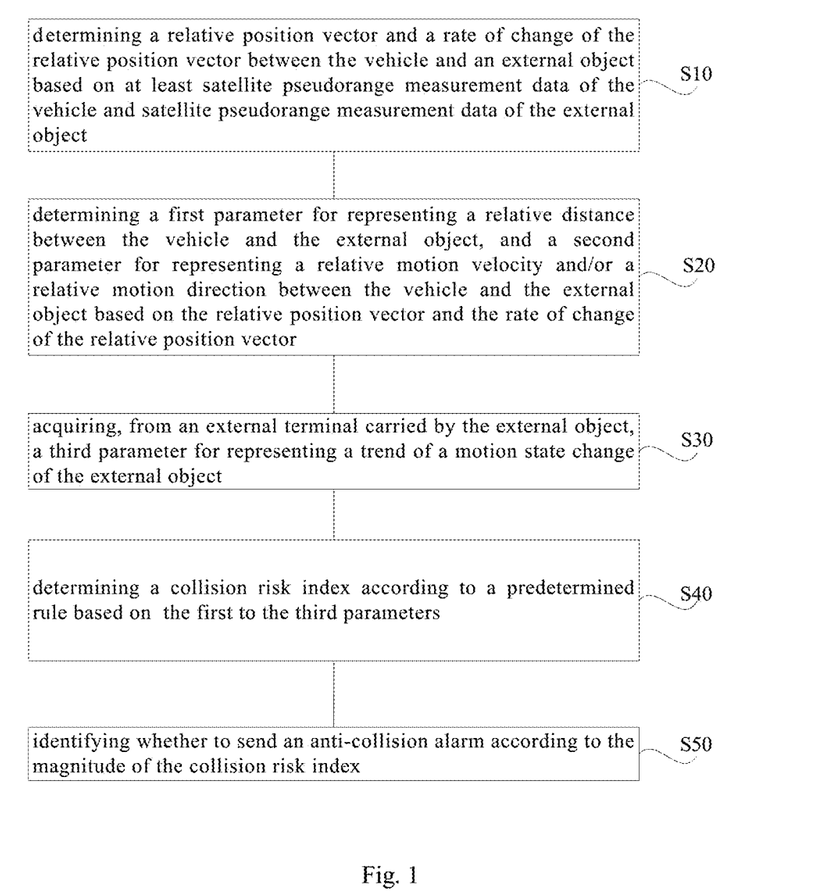
FIG. 1 is a flow chart of a vehicle anti-collision forewarning method according to an embodiment of the present disclosure.

FIG. 1 is a flow chart of a vehicle anti-collision forewarning method according to an embodiment of the present disclosure. As shown in FIG. 1, the method may be executed by an in-vehicle computer device and comprise the following steps 10-50, for example, as further described below.

In step 10, the in-vehicle computer device may determine a relative position vector between the vehicle and an external object and its rate of change based on at least satellite pseudorange measurement data of the vehicle and satellite pseudorange measurement data of the external object.

In an example embodiment, the satellite pseudorange measurement data of the vehicle is obtained by a first satellite observation receiver deployed in the vehicle, the satellite pseudorange measurement data of the external object is obtained by a second satellite observation receiver deployed in the external terminal. The first and second satellite observation receivers may be a GNSS receiver, or a Beidou positioning information receiver, etc., which is not limited in the present disclosure.

In step 20, based on the relative position vector and the rate of change thereof, the in-vehicle computer device may determine a first parameter for representing a relative distance between the vehicle and the external object, and a second parameter for representing a relative motion velocity and/or a relative motion direction between the vehicle and the external object.

In step 30, the in-vehicle computer device may acquire, from an external terminal carried by the external object, a third parameter for representing a trend of a motion state change of the external object. In an exemplary embodiment, the external object may be an external pedestrian, the external terminal may be a portable terminal device carried by the external pedestrian or an in-vehicle computer device of another vehicle in which the external pedestrian is located.

In an exemplary embodiment, the in-vehicle computer device is provided with a chip supporting cellular mobile communication network or DSRC. As such, the in-vehicle computer device communicates with the external terminal via a mobile communication network. If the external terminal is also provided with a DSRC chip, the in-vehicle computer device communicates with the external terminal upon respective DSRC chips.

In step 40, the in-vehicle computer device may determine a collision risk index according to a predetermined rule based on the first to the third parameters. The predetermined rule may be: the smaller the first parameter is, the shorter the relative distance is, and the higher the collision risk index is; the larger the second parameter is, the higher the relative motion velocity is or the smaller the angle of the relative motion direction is, and the higher the collision risk index is; the larger the third parameter is, the higher a confidence of the motion state change of the external object is, and the higher the collision risk is.

In step 50, the in-vehicle computer device may identify whether to send an anti-collision alarm according to the magnitude of the collision risk index.

In the embodiment of the present disclosure, a communication based data fusion of the navigation satellite pseudorange values observed by the vehicle and the external object is realized to change an absolute positioning into a relative positioning for an application of vehicle anti-collision, without needing to independently calculate the absolute coordinates in each terminal, thereby avoiding potential disturbances encountered in the calculation of coordinates when using a single GNSS receiver, improving the positioning accuracy, and making the anti-collision forewarning more accurate.

Figure 2:
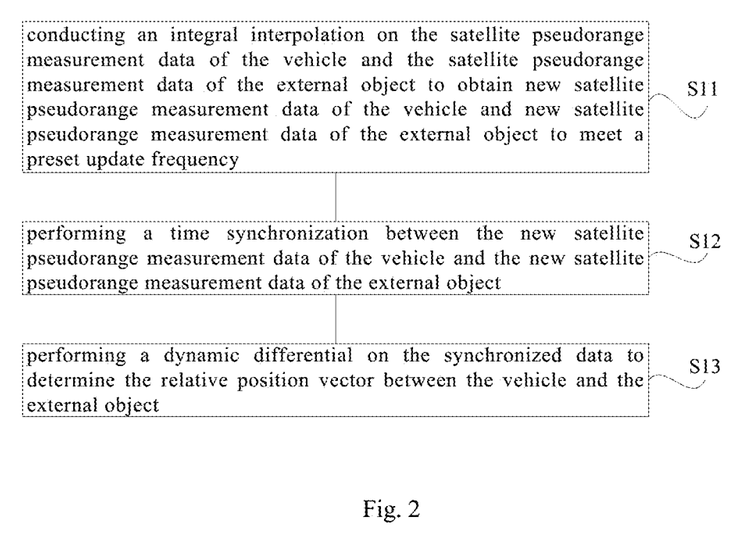
FIG. 2 is a flow chart of a vehicle anti-collision forewarning method according to another embodiment of the present disclosure.

FIG. 2 is a flow chart of a vehicle anti-collision forewarning method according to another embodiment of the present disclosure. With respect to the specific execution, in an embodiment, step 10 includes, for example, the following sub-steps, as shown in FIG. 2.

In step 11, an integral interpolation on the satellite pseudorange measurement data of the vehicle and the satellite pseudorange measurement data of the external object may be performed to obtain new satellite pseudorange measurement data of the vehicle and new satellite pseudorange measurement data of the external object to meet a preset update frequency.

In step 12, a time synchronization on the new satellite pseudorange measurement data of the vehicle and the new satellite pseudorange measurement data of the external object is performed.

In step 13, a dynamic differential on data obtained after the time synchronization is performed to determine the relative position vector between the vehicle and the external object.

In the embodiment of the present disclosure, not only the positioning resolution is improved by a communication based data fusion of the navigation satellite pseudorange values observed, but the relative positioning accuracy is also improved by the use of differential technology so as to meet the demands of anti-collision applications.

In some embodiments, the vehicle anti-collision forewarning method further includes: the in-vehicle computer device may determine a displacement vector of the vehicle based on vehicle dynamics model and high-precision inertial navigation information collected by the vehicle for continuously updating the relative position vector.

The displacement vector of the vehicle may have two functions: the one is used to calculate a rate of change of baseline vector $b_{km}$, the other is to directly subtract the displacement vector from an initial baseline vector of the origin in the inertial system to maintain a continuous estimate of the baseline vector, when satellite signals are interrupted or the number of satellites in the field of view is insufficient to list enough equations to be solved.

In some embodiments, the vehicle anti-collision forewarning method further includes: the in-vehicle computer device may correct an error on relative position vector according to the satellite pseudorange measurement data of the vehicle and satellite pseudorange measurement data of the external object.

Since the displacement of the vehicle is calculated by integrating the rate of change, the error will continue to expand over time. Therefore, using external observations data to correct in certain time interval, will contribute to improve an estimation accuracy of the displacement vector. Here, the variation of the satellite pseudorange measurement value may be used as an external observation constraint. The specific constraint equation is that the projection of the displacement vector in the satellite direction should be equal to the pseudorange variation in the corresponding time.

Another error source for estimating the baseline vector is the movement of the pedestrian. The typical pedestrian movement velocity usually does not exceed 1.5 m/s. When integration time is longer than 1 second, the given stationary pedestrian will bring a meter-level error. Thus, for the baseline vector obtained by integration, it is also necessary to further correct the error using pseudorange double difference and pseudorange single difference.

In some embodiments, an in-vehicle computer device is provided, which comprise: at least one processor; and a memory communicably connected with the at least one processor for storing instructions executable by the at least one processor, wherein execution of the instructions by the at least one processor causes the at least one processor to:

determine a relative position vector and a rate of change of the relative position vector between the vehicle and an external object based on at least satellite pseudorange measurement data of the vehicle and satellite pseudorange measurement data of the external object;

determine a first parameter for representing a relative distance between the vehicle and the external object, and a second parameter for representing a relative motion velocity and/or a relative motion direction between the vehicle and the external object based on the relative position vector and the rate of change of the relative position vector;

acquire, from an external terminal carried by the external object, a third parameter for representing a trend of a motion state change of the external object;

determine a collision risk index according to a predetermined rule based on the first to the third parameters, wherein the predetermined rule is: the smaller the first parameter, the shorter the relative distance, and the higher the collision risk index; the larger the second parameter, the higher the relative motion velocity or the smaller the angle of the relative motion direction, and the higher the collision risk index; the larger the third parameter, the higher a confidence of the motion state change of the external object, and the higher the collision risk; and identify whether to send an anti-collision alarm according to the magnitude of the collision risk index.

In an exemplary embodiment, the satellite pseudorange measurement data of the vehicle is obtained by a first satellite observation receiver deployed in the vehicle, and the satellite pseudorange measurement data of the external object is obtained by a second satellite observation receiver deployed in the external terminal.

In an exemplary embodiment, the external object is an external pedestrian, the external terminal is a portable terminal device carried by the external pedestrian or an in-vehicle computer device of another vehicle in which the external pedestrian is located.

In an exemplary embodiment, the in-vehicle computer device is provided with a chip supporting cellular mobile communication network or DSRC. As such, the in-vehicle computer device communicates with the external terminal via a mobile communication network. If the external terminal is also provided with a DSRC chip, the in-vehicle computer device communicates with the external terminal upon respective DSRC chips.

In some embodiments, the in-vehicle computer device is configured for:

conducting an integral interpolation on the satellite pseudorange measurement data of the vehicle and the satellite pseudorange measurement data of the external object to obtain new satellite pseudorange measurement data of the vehicle and new satellite pseudorange measurement data of the external object to meet a preset update frequency;

performing a time synchronization between the new satellite pseudorange measurement data of the vehicle and the new satellite pseudorange measurement data of the external object; and performing a dynamic differential on synchronized data to determine the relative position vector between the vehicle and the external object.

In some embodiments, the in-vehicle computer device is further configured for: determining a displacement vector of the vehicle based on vehicle dynamics model and high-precision inertial navigation information collected at the vehicle end for continuously updating the relative position vector.

The displacement vector of the vehicle herein may have two functions: the one is used to calculate a rate of change of baseline vector $b_{km}$, the other is to directly subtract the displacement vector from an initial baseline vector of the origin of the inertial system to maintain a continuous estimate of the baseline vector when a satellite signal is interrupted or the number of satellites in the field of view is insufficient to list enough equations to be solved.

In some embodiments, the in-vehicle computer device is further configured for: correcting an error on relative position vector according to the satellite pseudorange measurement data of the vehicle and satellite pseudorange measurement data of the external object.

Since the displacement of the vehicle is calculated by integrating the rate of change, the error will continue to expand over time. Therefore, using external observations data to correct in certain time interval, will contribute to improve an estimation accuracy of the displacement vector. Here, the variation of the satellite pseudorange measurement value can be used as an external observation constraint. The specific constraint equation is that the projection of the displacement vector in the satellite direction should be equal to the pseudorange variation in the corresponding time.

According to this method, another error source for estimating the baseline vector is the movement of the pedestrian. The typical pedestrian movement velocity usually does not exceed 1.5 m/s. When integration time is longer than 1 second, the given stationary pedestrian will bring a meter-level error. Thus, for the baseline vector obtained by integration, it is also necessary to further correct the error using pseudorange double difference and pseudorange single difference.

In some embodiments, the present disclosure provides a vehicle anti-collision forewarning system. The system includes an in-vehicle computer device and an external terminal.

The external terminal comprises a satellite observation receiver configured for obtaining satellite pseudorange measurement data of an external object, and a transmitter configured for sending motion status information to the in-vehicle computer device.

The in-vehicle computer device having at least one processor, a memory in electronic communication with the processor and instructions stored in the memory, wherein execution of the instructions by the at least one processor causes the at least one processor to: determine a relative position vector and a rate of change of the relative position vector between the vehicle and the external object based on at least satellite pseudorange measurement data of the vehicle and satellite pseudorange measurement data of the external object; determine a first parameter for representing a relative distance between the vehicle and the external object, and a second parameter for representing a relative motion velocity and/or a relative motion direction between the vehicle and the external object based on the relative position vector and the rate of change of the relative position vector; acquire, from the transmitter of the external terminal, a third parameter for representing a trend of a motion state change of the external object; determine a collision risk index according to a predetermined rule based on the first to the third parameters, wherein the predetermined rule is: the smaller the first parameter, the shorter the relative distance, and the higher the collision risk index; the larger the second parameter, the higher the relative motion velocity or the smaller the angle of the relative motion direction, and the higher the collision risk index; the larger the third parameter, the higher a confidence of the motion state change of the external object, and the higher the collision risk; and identify whether to send an anti-collision alarm according to the magnitude of the collision risk index.

It should be noted that, for the foregoing method embodiments, for the sake of brief description, all of the method embodiments are described as a series of operation combinations. However, those skilled in the art should understand that the disclosure is not limited to the sequence of operations described, because certain steps may be performed in other sequences or concurrently according to the disclosure. Secondly, those skilled in the art should also understand that some embodiments described in the specification may belong to the preferred embodiments, and the actions and modules involved may be not necessarily required by the disclosure. In the foregoing embodiments, the description of each embodiment has its own emphasis. For the parts that are not described in detail in one embodiment, reference may be made to related descriptions in other embodiments.

In some embodiments, there is a non-transitory computer-readable storage medium storing one or more programs including executable instructions, which may be read and executed by an electronic device (including but not limited to a computer, server, or network device, etc.) for performing any one of vehicle anti-collision forewarning methods of the present disclosure as described above.

In some embodiments, there is a computer program product comprising a computer program stored on a non-transitory computer-readable storage medium. The computer program includes executable instructions, and when executed by a computer, causing the computer to perform any one of vehicle anti-collision forewarning methods of the present disclosure as described above.

In some embodiments, there is further provided an electronic device, including: at least one processor, and a memory in communication with the at least one processor. The memory stores instructions executed by the at least one processor, and when executed by the at least one processor, causing the at least one processor to perform any one of vehicle anti-collision forewarning methods of the present disclosure as described above.

In some embodiments, there is also provided a storage medium storing a computer program thereon, and when executed by a processor, causing the processor to perform any one of vehicle anti-collision forewarning methods of the present disclosure as described above.

In some embodiments, the present disclosure provides a method for pedestrian positioning measurement. The innovation is to perform data fusion using raw data from the Global Navigation Satellite System (GNSS) instead of directly using positioning data generated by a terminal GNSS receiver. This is because positioning result of each terminal receiver is calculated separately according to its satellite pseudorange measurement data. Due to the multipath effect caused by obstacle reflecting satellite signals in the environment and the delay effect of the Earth's atmosphere on signal transmission, position coordinates generated by the calculation of the GNSS receiver alone usually have a positioning error that exceeds meter level, and such accuracy is not sufficient for the application scenario of collision avoidance between a vehicle and a pedestrian.

Through Pedestrian to Vehicle (P2V) communication based on pedestrian-held smart devices, GNSS receivers deployed on the vehicle and the pedestrian may share their original pseudorange measurement information, thereby eliminating pseudorange errors and improving positioning accuracy through dynamic differential technology. Conventional GNSS satellite navigation and positioning is of an absolute positioning in the global coordinate system. According to previous Vehicle to Pedestrian (V2P) communication technology, the positions of vehicles and pedestrians are uniformly placed in the global coordinate system to consider. The concept of the method lies in changing the absolute positioning of pedestrian into relative positioning: from the perspective of driving safety collision avoidance, the vehicle only needs to know the position and moving direction of the pedestrian with respect to the vehicle, but the absolute position coordinates are not necessary. The relative position may be calculated more accurately on the basis of the data fusion between the pedestrian end and the vehicle end, thereby significantly improving the accuracy of pedestrian positioning measurement.

The method may include at least the following steps: 1) an information collecting and processing device with communication capability is loaded at a vehicle end, and a smart device having basic GNSS positioning and communication networking capability is carried by a pedestrian end. The device of vehicle end includes a dual-antenna GNSS receiver and a high-precision inertial navigation device, a optical sensors such as camera may also be included. At the same time, the device of vehicle end also needs to have a certain amount of computing processing capability; 2) various information, such as pseudorange information between a vehicle and satellites, vehicle velocity, pose information, and instant high frequency inertial navigation information are collected by various onboard sensors, if there is a camera, image information is also included; 3) receiving peripheral pedestrian handheld device information via a network, including but not limited to GNSS pseudorange raw data and other information preprocessed by the pedestrian handheld device; 4) the measured data from an external terminal and from the vehicle end are synchronized by a special time synchronization module of a computer device at the vehicle end; 5) the synchronized data are fused by using a dynamic differential technology to calculate the relative position between the vehicle and the pedestrian and the rate of change thereof; 6) According to the relative position and rate of change of current vehicle and surrounding pedestrian, current collision risk between the vehicle and the pedestrian is calculated to instruct the vehicle control system to send an alarm or to make an intervention. The above steps will be described in detail below.

Figure 3:
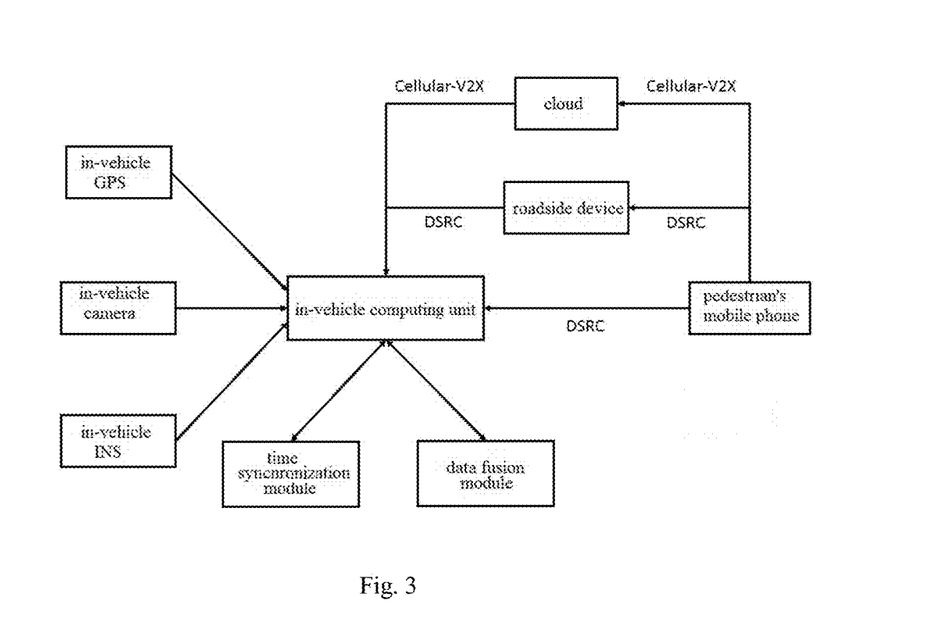
FIG. 3 is a schematic diagram of a vehicle anti-collision forewarning system according to an embodiment of the present disclosure.

1) Firstly, the architecture of the system is based on communication distributed among multiple terminals. As shown in FIG. 3, the Pedestrian to Vehicle (P2V) communication system built by the method takes an in-vehicle computing unit as a core, which may receive data from both the pedestrian end and the cloud end through multiple modal communication units. At the same time, in-vehicle sensors are used to collect current status data and environmental data of the vehicle. A time synchronization module and a data fusion module in the computing unit further process the received and collected data to output relative position and its change rate of the pedestrian. The in-vehicle sensors may include a dual-antenna GNSS receiver, a high-precision inertial navigation device, a CAN (Controller Area Network) bus parser (such as PCAN and CAN2USB), and may also include a monocular/binocular camera and a optical sensor such as laser radar. On the other hand, a smart device at the pedestrian end only requires the most basic GNSS global navigation function and communication function. Taking a smart phone as an example, the device at pedestrian end may upload received satellite navigation data to the cloud through cellular mobile communication network (such as 4G-LTE), while a mobile phone equipped with a DSRC chip may directly transmit information to a vehicle or a roadside device. A smart device represented by a mobile phone often has some terminal computing capabilities, which may perform pre-processing on the data collected by the pedestrian end to some extent. However, since most handheld devices are limited by battery capacity, there is a problem that the satellite signal receiving frequency is low and the information transmission frequency is low.

2) The pedestrian positioning calculated by the method is a positioning with respect to the position of the vehicle, so the perception of the state of the vehicle needs to be very precise. The first of all is the precision of time resolution. For the urban vehicle scene with the most interaction with pedestrians, vehicle velocity may reach up to 20 m/s. According to the sub-meter positioning accuracy requirement of the collision avoidance prediction, an update frequency of the vehicle motion state needs to reach 20 Hz. Refresh frequency of the vehicle motion state on the CAN bus may meet this requirement. Therefore, high-frequency vehicle velocity information may be obtained through the CAN parser. Camera refresh frequency may easily reach 30 Hz or more, so the high-frequency image information may also be obtained immediately. The difficulty herein is how to obtain high-frequency information based on satellite signal observation, including satellite pseudorange measurement information and vehicle heading information. Because mainstream in-vehicle GNSS receiver may only achieve 5 Hz tracking and interpretation for satellite signals, in order to improve the update frequency, this method performs an integral interpolation using high-precision inertial navigation information.

Figure 4:
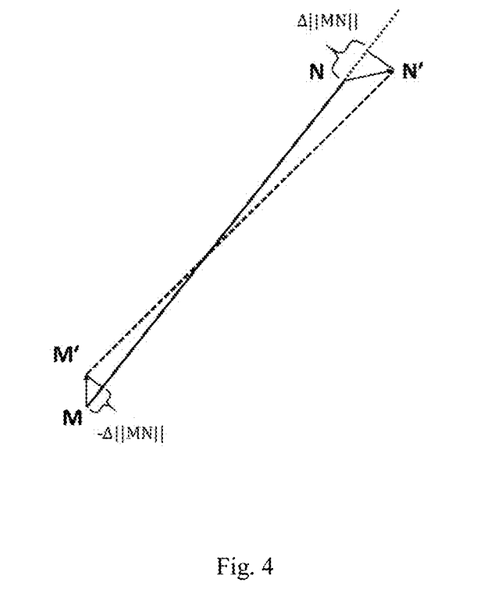
FIG. 4 is a schematic diagram of pseudorange interpolation involved in the vehicle anti-collision forewarning method of the present disclosure.

2a. Integral Interpolation Method for Satellite Pseudorange Measurement Data:

FIG. 4 illustrates a basic principle of interpolation for pseudorange measurement information. To put simply, since the distance between the satellite and the antenna is very long, the direction of a vector $\overrightarrow{MN}$ from an antenna M to a satellite N may be regarded as unchanged if the two endpoints M and N change within a small range, such that the variation of the satellite pseudorange measurement after a time increment $\Delta t$ may be calculated by the projection of the respective motion vectors of the two endpoints in the direction of the vector $\overrightarrow{MN}$.

The specific implementation may be as follows: a direction vector of the vehicle relative to each visible navigation satellite is firstly updated at a certain frequency (generally 1 Hz to ensure good accuracy) in the in-vehicle computing unit, and absolute coordinates calculated by single GNSS receiver may be used to calculate the direction vector. Then, a motion vector $\overrightarrow{MM'}$ of the vehicle in $\Delta t$ may be calculated using vehicle dynamic model in combination with high-precision inertial navigation information at the M end (i.e., the vehicle end), and a motion vector $\overrightarrow{NN'}$ of the satellite may be calculated using real-time ephemeris at the N end (i.e., the satellite end).

Assuming the director vector is expressed as: $\overrightarrow{D(MN)} = \overrightarrow{MN}/\|\overrightarrow{MN}\|$ Then satellite pseudorange variation is expressed as:

$$d(MN) = \overrightarrow{MM'} * \overrightarrow{D(MN)} + \overrightarrow{NN'} * \overrightarrow{D(MN)}$$

2b. Continuous Estimation Method for Vehicle Heading Angle:

In some embodiments, the estimation for vehicle heading angle includes an estimate of vehicle's own pose and an estimate of the current velocity vector. The vehicle's own pose provides a rotation matrix R of the local coordinate system with respect to the global coordinate system for integral interpolation, while the estimation of the velocity vector provides initial velocity components $V_\eta$ and $V_\varepsilon$ at the origin of the local coordinate system. The current velocity direction of the vehicle is not always consistent with the longitudinal pose of the vehicle body due to the lateral motion, especially in the case of cornering, the current velocity direction will be continuously changed. Therefore, the estimation of the current velocity direction requires the use of temporal difference positioning. In the case of low positioning frequency, in order to obtain high-frequency current velocity direction data, the lateral velocity of the vehicle body may be acquired by integral measurement using a high-precision inertial accelerometer, and the slip angle of the vehicle velocity with respect to a longitudinal axis may be calculated by a ratio of lateral velocity component to a longitudinal velocity component, while the direction of the longitudinal axis of the vehicle may be obtained by high-precision magnetometer augmented with dual-antenna GNSS receiver.

3) A communication device at vehicle end may receive data from cloud end or from pedestrian end. Such communication device may be a DSRC device dedicated to Internet of Vehicles or a cellular mobile network device (such as 4G). DSRC has a mature specification, and commercialization of device is more mature, but the use scenario needs to be supported by roadside devices or smart devices with DSRC chip at pedestrian end. Although the mobile cellular network has some limitations in latency and reliability, but it has broader coverage thanks to its popularization. The method may include any one of communication modals, and the data content transmitted by the pedestrian end may include satellite pseudorange measurement value with timestamps, and may also include additional information such as pedestrian motion orientation, motion velocity, and receiver clock error. An acquisition frequency and an acquisition type of additional information may depend on the computing power and battery status of the smart device at pedestrian end. The method currently develops an estimation method for pedestrian motion orientation and motion velocity based on a mobile phone Micro-electromechanical Systems Inertial Measurement Units (MEMS IMU). According to the method, a user requires to first set common carrying modes of the mobile phone when walking and record the sample data. To provide an illustrative example, there are four modes for a person to carry the mobile phone when walking: placing in a side pocket of outer pants; placing in a back pocket of outer pants; placing near the ear (calling mode); and placing on the front of the body (texting mode). In this case, the user requires to demonstrate these four carrying modes separately, and record IMU signals and the corresponding velocity (calculated by global navigation) in various modes. In practice, the mobile phone MEMS IMU may collect data and identify the current mobile phone carrying mode based on the user's sample data, and further estimate a walking velocity of the user after the identification is completed. Pedestrian motion orientation information may be mainly provided by mobile phone GNSS temporal difference positioning, which is limited by the fact that the positioning frequency does not reflect the change of pedestrian orientation in real time. According to the method, it utilizes the periodic signal interruption of a gyroscope in the MEMS IMU to reflect a change of pedestrian state, including a change in orientation, may also a change in mobile phone carrying mode, such as ending a call and putting the phone back into a pocket, which can be ruled out based on the event manager of the mobile operating system.

Figure 5:
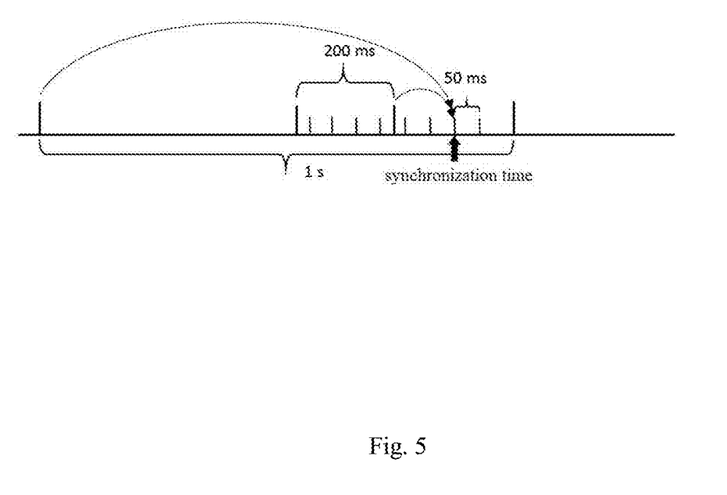
FIG. 5 is a schematic diagram of different sampling frequency time synchronization mechanisms involved in the vehicle anti-collision forewarning method of the present disclosure.

4) The time synchronization module in the in-vehicle computing unit is responsible for synchronizing the external information received by the communication module with the vehicle internal/peripheral information collected by the sensors in the vehicle for use by the data fusion module. A reference for the time synchronization may be a standard time of a certain GNSS system, such as the GPS standard time, or an operating system time of the computing unit. The principle of time synchronization is that the timestamp of the satellite pseudorange measurement value collected by the vehicle end is used as a scale, and the data from the remaining information source closest to the scale is synchronized to the scale. In an embodiment including one vehicle and two pedestrians, an update frequency of the vehicle satellite pseudorange information reaches 20 Hz by the interpolation of step 2), and an interval of time scales is 50 ms. A frequency of collecting pseudorange by the mobile phone at pedestrian end is 1 Hz, and the delay of information transmission in the cellular mobile network ranges from several tens of milliseconds to several hundred milliseconds. As shown in FIG. 5, at each 50 ms scale, for data from different information sources, the data whose timestamp is closest to the scale is synchronized forwardly to current scale. For the satellite pseudorange measurement value of pedestrian end, synchronization method is similar to the integral interpolation in step 2a, and a moving vector of satellite end is calculated by the satellite ephemeris, while the pedestrian end is considered to be fixed without movement (because the forward synchronization time is usually less than 1 s, a moving distance of pedestrian is negligible). The GNSS device at pedestrian end may self-correct clock difference with respect to standard time after an initialization is completed, but information of the pedestrian end may not include the clock difference information due to factors such as signal interruption or initialization failure, and in this case, the received satellite signal transmission time may be used uniformly for synchronization reference.

Figure 6:
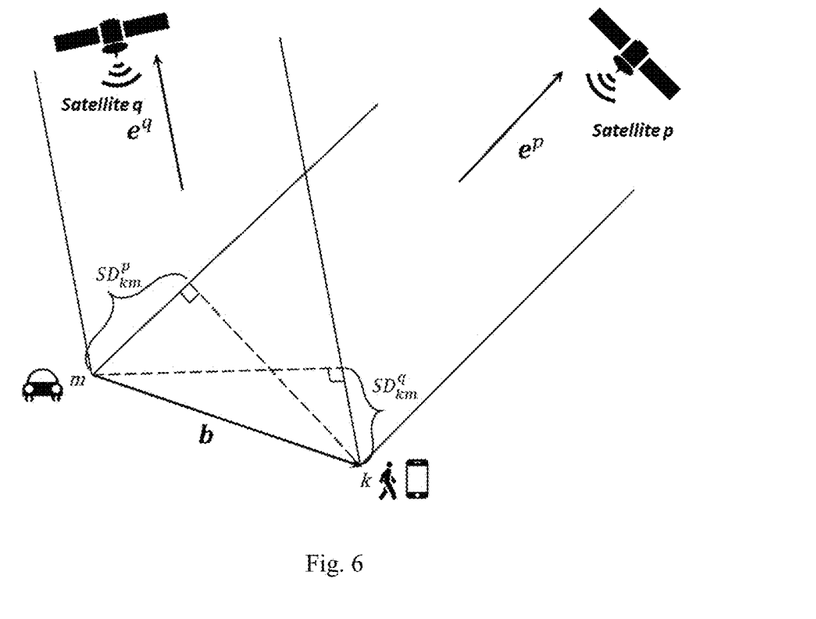
FIG. 6 is a schematic diagram of relative position of vehicle to pedestrian calculated by the satellite pseudorange differential of the present disclosure.

5) After the time synchronization is completed, the data fusion module of the computing unit may begin a dynamic differential process to calculate relative position vector $\overrightarrow{KM}$ KM between the vehicle and the pedestrian (see FIG. 6) and the rate of change thereof $\overrightarrow{d(KM)}/dt$. The specific flow of the method is as follows: First, a pseudorange difference $SD_{km}^P = R_k^P - R_m^P$ between the vehicle K and the pedestrian M relative to the same satellite P is calculated, and then a pseudorange double difference is further calculated for the satellites P and Q simultaneously observed by the two receivers at the K and M ends. As shown in FIG. 6, direction vectors of the satellite are convergence within a small range, and its principle is the same as that of the pseudorange integral interpolation in step 2). Therefore, observation vectors of the same satellite for the two terminal receivers may be regarded as parallel, the direction vector is denoted as $e_p$, and the baseline vector connecting the two terminals is denoted as $b_{km}$. It can be seen that with reference to FIG. 6, the pseudorange difference is equal to the projection of the baseline vector on the direction vector. As a result, it can be expressed as:

$$SD_{km}^P = b_{km} * e_p, DD_{km}^{Pq} = b_{km} * (e_p - e_q).$$

For N common observation satellites, a total of (N(N−1))/2 pseudorange double difference equations may be listed, which may be written in matrix form:

$$\begin{bmatrix} DD_{km}^{12} \\ DD_{km}^{13} \\ \vdots \\ DD_{km}^{N-1N} \end{bmatrix} = \begin{bmatrix} e_{12x} & e_{12y} & e_{12z} \\ e_{13x} & e_{13y} & e_{13z} \\ \vdots & \vdots & \vdots \\ e_{N-1Nx} & e_{N-Ny} & e_{N-1Nz} \end{bmatrix} \begin{bmatrix} b_x \\ b_y \\ b_z \end{bmatrix}$$

A baseline vector $b_{km}$ representing a relative position between the vehicle and the pedestrian may be calculated by some classical matrix equation solutions such as least squares.

A rate of change of the baseline vector $b_{km}$ may be directly calculated by temporal-difference, or may be inferred by calculating the amount of movement of the vehicle end by regarding the pedestrian position as unchanged when the vehicle is moving at a non-low velocity. The first method is to perform vector subtraction on the timing of the calculated baseline vector connecting the vehicle and the pedestrian to obtain the motion vector in the timing step, then a rate of change of the motion vector may be obtained dividing the motion vector by a step size. Since the calculation frequency of the baseline vector is low (5 Hz), the rate of change calculated by this method may have a time delay. The second method directly estimates a rate of change using the vehicle velocity vector measured by the high-precision inertial navigation at the vehicle end, and improves the update frequency of the timing. The disadvantage is that the movement of the pedestrian is not considered, and the error will be expanded over time. Therefore, the motion vector of one step calculated by the first method is used to correct the rate of change of the vehicle velocity by integration. For example, such a correction can take the form of Kalman filtering, which may be regarded as a weighted average of the rate of change obtained by difference and the rate of change obtained by the integration.

Figure 7:
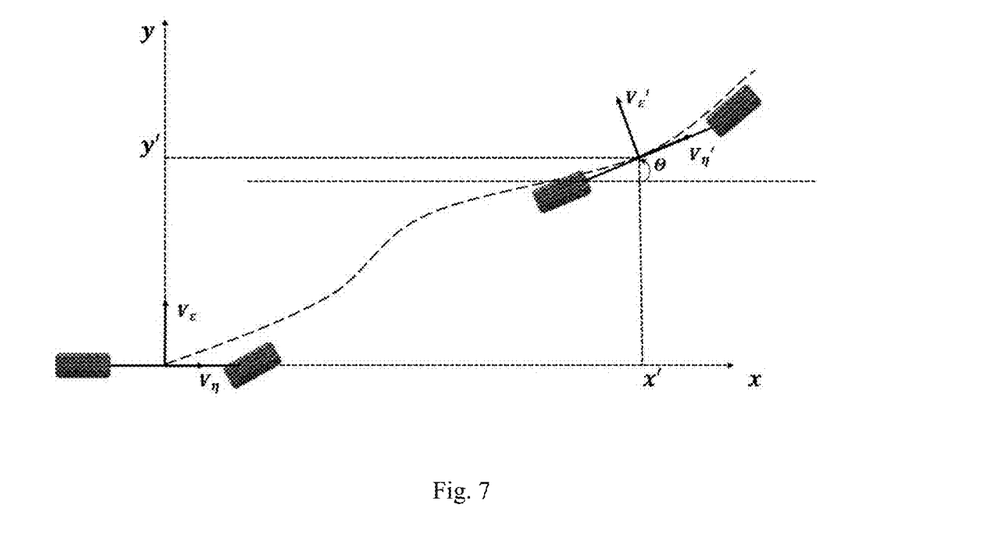
FIG. 7 is a schematic diagram of a three freedom degrees vehicle dynamics model involved in the vehicle anti-collision forewarning method of the present disclosure.

The second method mentioned above may function as a fault-tolerant mechanism to continuously output the rate of change when the satellite signal is interrupted or interfered. Here, the calculation of the amount of movement of the vehicle end uses a vehicle dynamics model and a high-precision inertial navigation. Taking a three freedom degrees vehicle dynamics model as an example, as shown in FIG. 7, the vehicle state space model may includes five states, velocity components of the longitudinal axis and transverse axis of the vehicle are represented as $V_n$, $V_\varepsilon$, coordinates of the vehicle in the inertial coordinate system are x, y, and a rotation angle (that is a rotation angle of the longitudinal axis of the vehicle body relative to the initial direction) of the longitudinal axis of the vehicle with respect to the inertial coordinate system is θ. The inertial coordinate system may be set as the vehicle coordinate system of the vehicle at a certain time, and the transverse and longitudinal axes orientations of the vehicle body at this moment are known relative to the global coordinate system of the navigation system. The transverse and longitudinal axes orientations of the vehicle body may be estimated by using a magnetometer, a temporal-difference of position, a dual-antenna GNSS receiver, or a combination thereof. The quickest way is to use a magnetometer to estimate the vehicle body pose rotation matrix R and then use a dual-antenna GPS receiver to improve its accuracy. After establishing coordinates, state space equation for vehicle motion is established as follows:

$\dot{x}_1 = a_\varepsilon - x_2 \omega.$ $\dot{x}_2 = a_\eta - x_1 \omega$ $\dot{x}_3 = -x_1 \sin x_5 + x_2 \cos x_5.$ $\dot{x}_4 = -x_1 \sin x_5 + x_2 \cos x_5$ $\dot{x}_5 = \omega$ wherein, $x_1 = V_\varepsilon$, $x_2 = V_\eta$, $x_3 = x$, $x_4 = y$, $x_5 = \theta$, $a_\varepsilon$ and $a_\eta$ are accelerations in the transverse and longitudinal axes of the vehicle body, respectively, and ω is the yaw rate of the vehicle body. All three parameters may be measured by a high-precision inertial navigation, and the time-varying coefficient of the state space equation is placed on the right side of the equation according to this method. A position (x, y) of the vehicle in the two-dimensional inertial coordinate system may be obtained by integrating, then an expression ($b_{vx}$, $b_{vy}$, $b_{vz}$) of the vehicle displacement vector (x, y, 0) in the global ECEF coordinate system may be inversely calculated using the previous estimated rotation matrix R.

$$\begin{bmatrix} b_{vx} \\ b_{vy} \\ b_{vz} \end{bmatrix} = R \begin{bmatrix} x \\ y \\ 0 \end{bmatrix}$$

The displacement vector of the vehicle may have two functions: the one is used to calculate a rate of change of baseline vector $b_{km}$, the other is to directly subtract the displacement vector from an initial baseline vector of the origin of the inertial system to maintain a continuous estimate of the baseline vector when a satellite signal is interrupted or the number of satellites in the field of view is insufficient to list enough equations to be solved.

Since the displacement of the vehicle is calculated by integrating the rate of change, the error will continue to expand over time. Therefore, using external observations data to correct in certain time interval, will contribute to improve an estimation accuracy of the displacement vector. Here, the variation of the satellite pseudorange measurement value may be used as an external observation constraint. The specific constraint equation is that the projection of the displacement vector in the satellite direction should be equal to the pseudorange variation in the corresponding time.

Another error source for estimating the baseline vector is the movement of the pedestrian. The typical pedestrian movement velocity usually does not exceed 1.5 m/s. When integration time is longer than 1 second, stationary assumption of the pedestrian will bring a meter-level error. Thus, for the baseline vector obtained by integration, it is also necessary to further correct the error using pseudorange double difference and pseudorange single difference.

When the error correction is performed for both cases at the same time, the state space equation can be extended to: $x_1 = V_\varepsilon$, $x_2 = V_\eta$, $x_3 = b_x$, $x_4 = b_y$, $x_5 = b_z$, $x_6 = b_{vx}$, $x_7 = b_{vy}$, $x_8 = b_{vz}$, $x_9 = 0$, ($b_{vx}$, $b_{vy}$, $b_{vz}$) is a displacement vector of the vehicle, ($b_x$, $b_y$, $b_z$) is a baseline vector $b_{km}$ between a vehicle and a pedestrian. Then an error correction observation equation may be established as follows:

$$\begin{bmatrix} DD_{12} \\ SD_1 \\ SD_2 \\ \Delta PR_1 \\ \Delta PR_2 \\ \vdots \\ \Delta PR_N \end{bmatrix} =$$

$$\begin{bmatrix} 0 & 0 & b_{1x}-b_{2x} & b_{1y-2y} & b_{1z}-b_{2z} & 0 & 0 & 0 & 0 \\ 0 & 0 & b_{1x} & b_{1y} & b_{1z} & 0 & 0 & 0 & 0 \\ 0 & 0 & b_{2x} & b_{2y} & b_{2z} & 0 & 0 & 0 & 0 \\ 0 & 0 & 0 & 0 & 0 & b_{1x} & b_{1y} & b_{1z} & 0 \\ 0 & 0 & 0 & 0 & 0 & b_{2x} & b_{2y} & b_{2z} & 0 \\ \vdots & \vdots & \vdots & \vdots & \vdots & \vdots & \vdots & \vdots & \vdots \\ 0 & 0 & 0 & 0 & 0 & b_{Nx} & b_{Ny} & b_{Nz} & 0 \end{bmatrix} \begin{bmatrix} x_1 \\ x_2 \\ x_3 \\ x_4 \\ x_5 \\ x_6 \\ x_7 \\ x_8 \\ x_9 \end{bmatrix} + v$$

wherein v is the error and noise vector, whose covariance depends on the quality of each satellite signal and the orientation of the satellite.

In this embodiment, assume that there are only two satellites observed simultaneously at the vehicle end and the pedestrian end. If there is only one common observation satellite, the first double difference equation of the equation set needs to be removed. If there is no common observation satellite, the first three equations of the equation set are all invalid. In this case, the equation set will only calculate motion error of the vehicle end.

Figure 8:
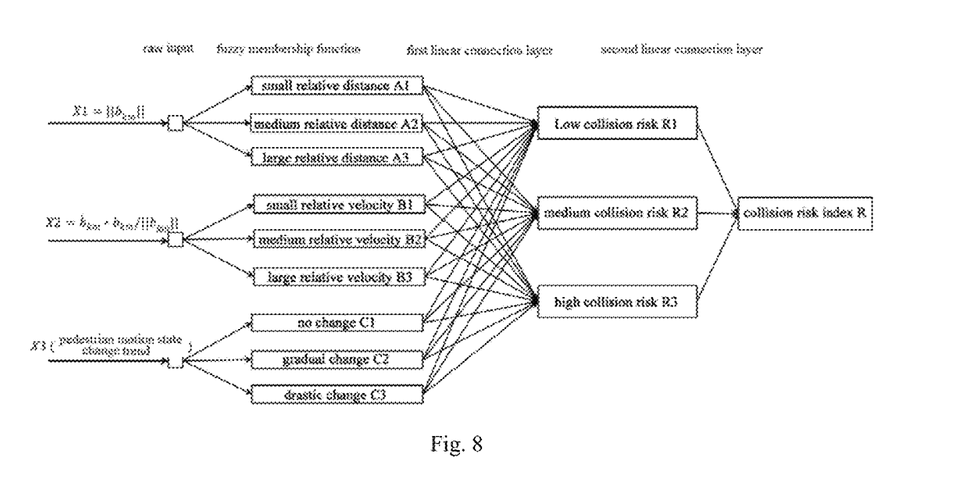
FIG. 8 is a schematic diagram of a fuzzy logic inference of collision risk according to an embodiment of the present disclosure.

6) The difference between this method and other methods is that the collision forewarning module of this method is not based on prediction of trajectory, but based on the inference of fuzzy logic. This is because the pedestrian trajectory is difficult to predict accurately, and the use of low-cost pedestrian devices such as smart phones does not provide accurate high-frequency pedestrian positioning. FIG. 8 is a schematic diagram of a fuzzy logic inference of collision risk used in the method. The input variables may include:

X1, a length of the current baseline vector$\|b_{km}\|$, it represents a distance between the vehicle and the pedestrian, the smaller the distance is, the higher the risk is;

X2, an inner product $\dot{b}_{km}*b_{km}/\|b_{km}\|$ between the normalized baseline vector and its rate of change, it represents relative motion velocity and relative motion direction of the vehicle and the pedestrian. An increase in the input variable indicates that the relative motion velocity increases or the angle between the rate of change vector and the baseline vector becomes smaller, both of which indicate an increase in the risk of collision.

X3, as a third input variable (its value range is between 0 and 1), it represents a confidence for current pedestrian motion state change, 1 means very certain the motion status is in a change, and 0 means very certain there is no change.

An output of the inference represents a degree of collision risk, and its value may be further correlated with the automatic braking system.

In some embodiments, a fuzzy logic inference of collision risk includes a fuzzy membership function layer, a first linear connection layer and a second linear connection layer which are sequentially connected, as shown in FIG. 8.

Figure 9:
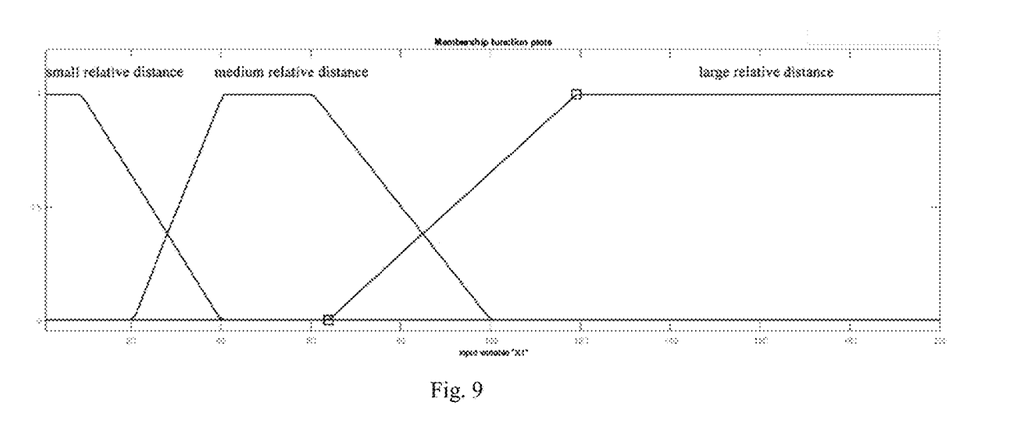
FIG. 9 is a schematic diagram of a first fuzzy membership function involved in the vehicle anti-collision forewarning method of the present disclosure.
Figure 10:
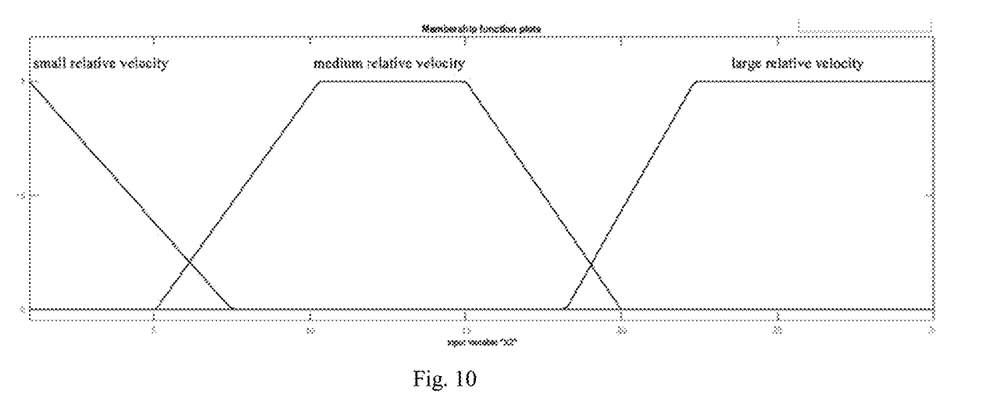
FIG. 10 is a schematic diagram of a second fuzzy membership function involved in the vehicle anti-collision forewarning method of the present disclosure.
Figure 11:
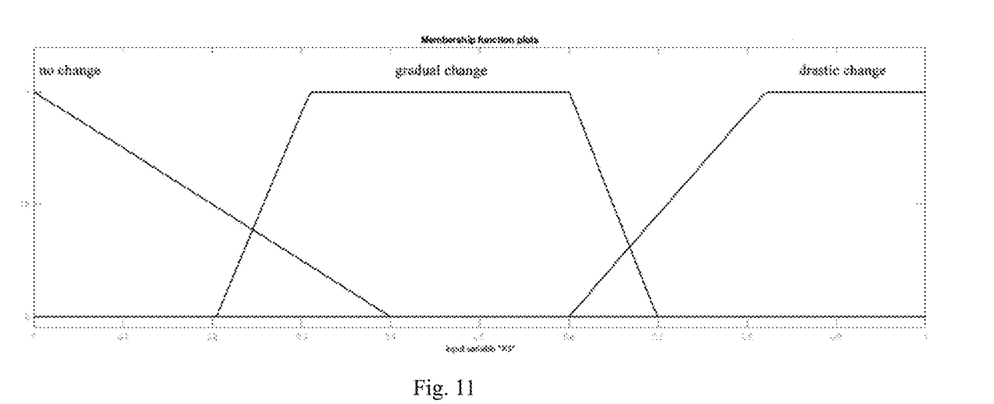
FIG. 11 is a schematic diagram of a second fuzzy membership function involved in the vehicle anti-collision forewarning method of the present disclosure.

The fuzzy membership function layer includes a first fuzzy membership function, a second fuzzy membership function, and a third fuzzy membership function which are corresponding to the three input variables X1, X2, X3, respectively. FIG. 9-11 illustrate the first to third fuzzy membership functions, respectively.

The first linear connection layer parameter may be valued as follows:

$R1=0.24A1+0.5A2+0.7A3+0.8B1+0.4B2+0.1B3+0.7C1+0.4C2+0.2C3$ $R2=0.3A1+0.8A2+0.3A3+0.2B1+0.7B2+0.2B3+0.9C1+0.5C2+0.1C3$ $R3=0.9A1+0.4A2+0.1A3+0.1B1+0.4B2+0.9B3+0.5C1+0.7C2+0.9C3$

The second linear connection layer parameter may be valued, for example:

$R=0.1R1+0.3R2+0.6R3$

According to the parameter setting as mentioned above, when X1=100 m, X2=20 m/s, X3=0.7, then A1=0, A2=0, A3=0.6555; B1=0, B2=0, B3=0.4367; C1=0, C2=0, C3=0.4531.

R1=0.59314, R2=0.3293, R3=0.8664. R=0.678 is the final calculated collision risk index.

It should be noted that the weight coefficients of each linear connection layer and the construction of each membership function are just an example. Best practice is to train the data generated by the driving accident simulator to obtain the most suitable parameters.

The main estimation method for whether the pedestrian motion state changes here is real-time monitoring of MEMS accelerometers and gyroscopes signals in smart devices at pedestrian end such as smart phones. As described in section 3), the pedestrian collects data samples in advance, and the inertial navigation signal in the normal walking state exhibits periodicity, and the periodicity may be temporarily interrupted when the walking state changes. The method for monitoring the periodic patterns here is similar to the method for the walking pattern recognition in section 3). In a specific implementation, a sampling process of the MEMS inertial navigation may be done by single-thread processing or multi-thread processing. If the sampling frequency is very high, six-dimensional data collected by the three-axis accelerometer and three-axis gyroscope may be performed in multi-threaded monitoring by six parallel programs. The monitoring program adopts a Sliding Window method. Specifically, a segment of signal extracted from one cycle back to current timestamp is analyzed every 0.1 seconds (i.e., 10 Hz) or 0.2 seconds (i.e., 5 Hz), wherein similarity between real-time signal and sample signal is quantified. The smaller the similarity, the more likely the state changes. In some embodiments, an efficient algorithm for similarity measurement is developed, which achieves data dimensionality reduction by segmenting discrete time domain signals. That is, the time domain signals are firstly segmented into at least K segments for line fitting, then the fitted line segments are characterized by a two element tuple (a median of the line segment is $z_k$, a slope of the line segment is $b_k$) as the feature of the segment signals. At this time, due to the existence of periodicity, it is necessary to calculate K similarity values in a cross correlation manner shown below as:

$[(z_1,b_1),(z_2,b_2),\ldots(z_K,b_K)][(z_2,b_2),(z_3,b_3),\ldots(z_1,b_1)],\ldots[(z_K,b_K),(z_1,b_1),\ldots(z_{K-1},b_{K-1})].$ Finally, one value with the largest matching degree is taken as final similarity. In at least one embodiment, the matching degree's calculation adopts the simplest Sum of Squared Difference (SSD), because the data has been undergone dimensionality reduction.

Figure 12:
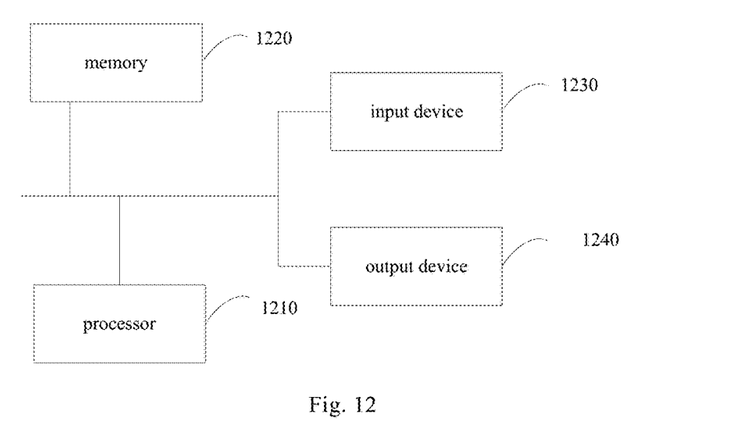
FIG. 12 is a schematic structural diagram of an electronic device according to an embodiment of the present disclosure.

FIG. 12 is a schematic diagram of a hardware structure of an electronic device for performing the vehicle anti-collision forewarning method according to another embodiment of the present application. As shown in FIG. 12, the device may include:

One or more processors 1210 and memory 1220. Although FIG. 12 shows the electronic device as having a single processor 1210, embodiments include the electronic device implementing any suitable number and/or type of processors to execute the embodiments as described herein.

In some embodiments, the device for performing the vehicle anti-collision forewarning method may also include an input device 1230 and an output device 1240.

The processor 1210, the memory 1220, the input device 1230, and the output device 1240 may be interconnected via a bus or any other suitable connection. FIG. 12 is illustrated showing a bus connection as an example, although the interconnections may be implemented as any suitable number and/or type of wired and/or wireless connections.

The memory 1220, as a non-transitory computer-readable storage medium, may be used to store non-transitory software programs, non-transitory computer-executable programs, such as the program instructions corresponding to the vehicle anti-collision forewarning method in the embodiments of the present disclosure. The processor 1210 executes various functional applications and data processing of the server by running the non-transitory software programs and the instructions stored in the memory 1220, so as to implement the vehicle anti-collision forewarning method according to the above method embodiments.

The memory 1220 may include a storage program area that stores application programs required by the operating system and by at least one function, and a data storage area that stores created data based on the use of the vehicle collision avoidance forewarning device, and so on. Further, the memory 1220 may include high-velocity random access memory, and a non-volatile memory as well, such as at least one magnetic disk storage device, flash memory device, or other non-transitory solid-state memory device. In some alternative embodiments, the memory 1220 may include memory provided remotely with respect to the processor 1210, and the remote memory may be connected to the vehicle anti-collision forewarning system via a network. Examples of such networks may include, but are not limited to, Internet, intranet, local area network, mobile communication network, and combinations thereof.

Input device 1230 may receive input numeric or character information and generate signals related to user settings and function control of the vehicle anti-collision forewarning system. Output device 1240 may include a display device such as a display screen.

The one or more modules are stored in the memory 1220, and when executed by the one or more processors 1210, perform vehicle anti-collision forewarning method in any of the above method embodiments.

The above product can execute the method provided in the embodiments of the present application, and has corresponding functional modules and beneficial effects for executing the method. For technical details that are not described in detail in this embodiment, reference may be made to the method provided in the embodiments of the present application.

The electronic device of the embodiment of the present disclosure exists in various forms, including but not limited to:

(1) Mobile communications devices: this kind of device is characterized by possessing mobile communications functions, with a main objective of providing voice and data communications. This kind of terminal may comprise: smart mobile phones (such as iPhone), multimedia mobile phones, functional mobile phones and low-end mobile phones.

(2) Ultra mobile personal computer devices: this kind of device belongs to the category of personal computer, has computing and processing functions, and in general also has the feature of mobile Internet. This kind of terminal may comprise: PDA, MID and UMPC devices, etc., such as an iPad.

(3) Portable entertainment devices: this kind of device can display and play multimedia contents. This kind of device may comprise: audio and video players (such as iPod), handheld game players, E-books, intelligent toys and portable car navigation equipment.

(4) Servers: a server is a device that provides computing services. The construction of a server may comprise a processor, a hard disc, an internal storage, and a system bus, etc. The architecture of a server is similar to that of a general computer. However, due to the need of providing highly reliable services, the server may have higher requirements on the aspects such as processing capacity, stability, reliability, security, scalability, and manageability.

(5) Other electronic devices having data interaction functions.

The device embodiments described above are merely illustrative. Units described herein as being separate components may be or may not be separated physically. Components described as units may be or may not be physical units. For instance, various components or units described herein may be located at the same place, or may be distributed over a communication network or as several networked units. The solution achieved by each of the embodiments may thus be realized by selecting some or all modules, components, units, etc., according to actual needs.

By means of the description of the above implementations, those skilled in the art may clearly understand that various implementations may be realized by means of software plus any suitable hardware platform, and may also be realized by means of hardware. Based on such understanding, the essence of the above technical solution may be embodied as a software product stored in a computer-readable medium such as ROM/RAM, magnetic diskette, optical disc, etc., and comprising instructions for execution by a computer device (such as a personal computer, a server, or a network device) to implement the various methods in accordance with the various embodiments described herein, or parts thereof.

Finally, it should be noted that the above embodiments are merely provided for describing the technical solution of the present disclosure, but are not intended as a limitation. Although the present disclosure has been described in detail with reference to the embodiments, those skilled in the art will appreciate that the technical solution described in the various embodiments above can still be modified, or some technical features therein can be equivalently replaced. Such modifications or replacements do not make the essence of corresponding technical solutions depart from the spirit and scope of technical solutions embodiments of the present disclosure.

The invention claimed is:

1. A vehicle anti-collision forewarning method, applied to an in-vehicle computer device, the method comprising:
   determining a relative position vector and a rate of change of the relative position vector between the vehicle and an external object based on at least satellite pseudorange measurement data of the vehicle and satellite pseudorange measurement data of the external object;
   determining a displacement vector of the vehicle based on a vehicle dynamics model and inertial navigation information;
   continuously updating the relative position vector by use of the displacement vector of the vehicle;
   determining a first parameter for representing a relative distance between the vehicle and the external object, and a second parameter for representing a relative motion velocity and/or a relative motion direction between the vehicle and the external object based on the relative position vector and the rate of change of the relative position vector;
   acquiring, from an external terminal carried by the external object, a third parameter for representing a trend of a motion state change of the external object, wherein the third parameter corresponds to a confidence of the motion state change of the external object;
   determining a collision risk index according to a predetermined rule based on the first to the third parameters, wherein the predetermined rule is: the smaller the first parameter, the shorter the relative distance, and the higher the collision risk index; the larger the second parameter, the higher the relative motion velocity or the smaller the angle of the relative motion direction, and the higher the collision risk index; the larger the third parameter, the higher a the confidence of the motion state change of the external object, and the higher the collision risk; and
   identifying whether to send an anti-collision alarm according to the magnitude of the collision risk index.

2. The method of claim 1, wherein the step of determining a relative position vector between the vehicle and the external object:
   conducting an integral interpolation on the satellite pseudorange measurement data of the vehicle and the satellite pseudorange measurement data of the external object to obtain new satellite pseudorange measurement data of the vehicle and new satellite pseudorange measurement data of the external object to meet a preset update frequency;
   performing a time synchronization between the new satellite pseudorange measurement data of the vehicle and the new satellite pseudorange measurement data of the external object; and
   performing a dynamic differential on the synchronized data to determine the relative position vector between the vehicle and the external object.

3. The method of claim 1, wherein the external object is an external pedestrian, the external terminal is a portable terminal device; or the external object is another vehicle, the external terminal is an in-vehicle computer device of the another vehicle.

4. The method of claim 1, wherein the satellite pseudorange measurement data of the vehicle is obtained by a first satellite observation receiver arranged in the vehicle, and the satellite pseudorange measurement data of the external object is obtained by a second satellite observation receiver arranged in the external terminal.

5. The method of claim 1, wherein the in-vehicle computer device communicates with the external terminal via a cellular mobile communication network, or the in-vehicle computer device communicates with the external terminal upon respective DSRC chips.

6. An in-vehicle computer device, comprising:
   at least one processor; and
   a memory communicably connected with the at least one processor for storing instructions executable by the at least one processor, wherein execution of the instructions by the at least one processor causes the at least one processor to:
   determine a relative position vector and a rate of change of the relative position vector between the vehicle and an external object based on at least satellite pseudorange measurement data of the vehicle and satellite pseudorange measurement data of the external object;
   determine a displacement vector of the vehicle based on a vehicle dynamics model and inertial navigation information for continuously updating the relative position vector;
   determine a first parameter for representing a relative distance between the vehicle and the external object, and a second parameter for representing a relative motion velocity and/or a relative motion direction between the vehicle and the external object based on the relative position vector and the rate of change of the relative position vector;
   acquire, from an external terminal carried by the external object, a third parameter for representing a trend of a motion state change of the external object, wherein the third parameter corresponds to a confidence of the motion state change of the external object;
   determine a collision risk index according to a predetermined rule based on the first to the third parameters, wherein the predetermined rule is: the smaller the first parameter, the shorter the relative distance, and the higher the collision risk index; the larger the second parameter, the higher the relative motion velocity or the smaller the angle of the relative motion direction, and the higher the collision risk index; the larger the third parameter, the higher a the confidence of the motion state change of the external object, and the higher the collision risk; and
   identify whether to send an anti-collision alarm according to the magnitude of the collision risk index.

7. The in-vehicle computer device of claim 6, wherein execution of the instructions by the at least one processor causes the at least one processor to:
   conduct an integral interpolation on the satellite pseudorange measurement data of the vehicle and the satellite pseudorange measurement data of the external object to obtain new satellite pseudorange measurement data of the vehicle and new satellite pseudorange measurement data of the external object to meet a preset update frequency;
   perform a time synchronization between the new satellite pseudorange measurement data of the vehicle and the new satellite pseudorange measurement data of the external object; and
   perform a dynamic differential on synchronized data to determine the relative position vector between the vehicle and the external object.

8. The in-vehicle computer device of claim 6, wherein the satellite pseudorange measurement data of the vehicle is obtained by a satellite observation receiver arranged in the vehicle.

9. The in-vehicle computer device of claim 6, wherein the in-vehicle computer device is provided with a chip supporting cellular mobile communication network or DSRC.

10. A vehicle anti-collision forewarning system comprising an in-vehicle computer device and an external terminal,
wherein the external terminal comprises a satellite observation receiver configured for obtaining satellite pseudorange measurement data of an external object, a transmitter configured for sending motion status information to the in-vehicle computer device; and
wherein the in-vehicle computer device having at least one processor, a memory in electronic communication with the processor and instructions stored in the memory, wherein execution of the instructions by the at least one processor causes the at least one processor to:
determine a relative position vector and a rate of change of the relative position vector between the vehicle and the external object based on at least satellite pseudorange measurement data of the vehicle and satellite pseudorange measurement data of the external object;
determine a displacement vector of the vehicle based on a vehicle dynamics model and inertial navigation information for continuously updating the relative position vector:
determine a first parameter for representing a relative distance between the vehicle and the external object, and a second parameter for representing a relative motion velocity and/or a relative motion direction between the vehicle and the external object based on the relative position vector and the rate of change of the relative position vector;
acquire, from the transmitter of the external terminal, a third parameter for representing a trend of a motion state change of the external object, wherein the third parameter corresponds to a confidence of the motion state change of the external object; determine a collision risk index according to a predetermined rule based on the first to the third parameters, wherein the predetermined rule is: the smaller the first parameter, the shorter the relative distance, and the higher the collision risk index; the larger the second parameter, the higher the relative motion velocity or the smaller the angle of the relative motion direction, and the higher the collision risk index; the larger the third parameter, the higher a the confidence of the motion state change of the external object, and the higher the collision risk; and
identify whether to send an anti-collision alarm according to the magnitude of the collision risk index.

* * * * *

UNITED STATES PATENT AND TRADEMARK OFFICE
CERTIFICATE OF CORRECTION

PATENT NO. : 11,312,375 B2
APPLICATION NO. : 16/564372
DATED : April 26, 2022
INVENTOR(S) : Lei Zuo et al.

Page 1 of 1

It is certified that error appears in the above-identified patent and that said Letters Patent is hereby corrected as shown below:

On the Title Page

At item (73) Assignees:
Please delete "Beijing Idriverplus Technology Co.," and replace it with --Beijing Idriverplus Technology Co., Ltd.--

Signed and Sealed this
Twenty-seventh Day of June, 2023

Katherine Kelly Vidal
*Director of the United States Patent and Trademark Office*